Jan. 14, 1969

F. S. LAPEYRE 3,421,620

PROCESS AND DEVICE FOR SEPARATION OF
COMPONENTS OF DIFFERENT SPECIFIC
GRAVITIES FROM MIXTURES THEREOF

Filed May 24, 1965

INVENTOR
FERNAND S. LAPEYRE

BY Wilkinson, MawRinney & Theibault
ATTORNEYS

INVENTOR
FERNAND S. LAPEYRE

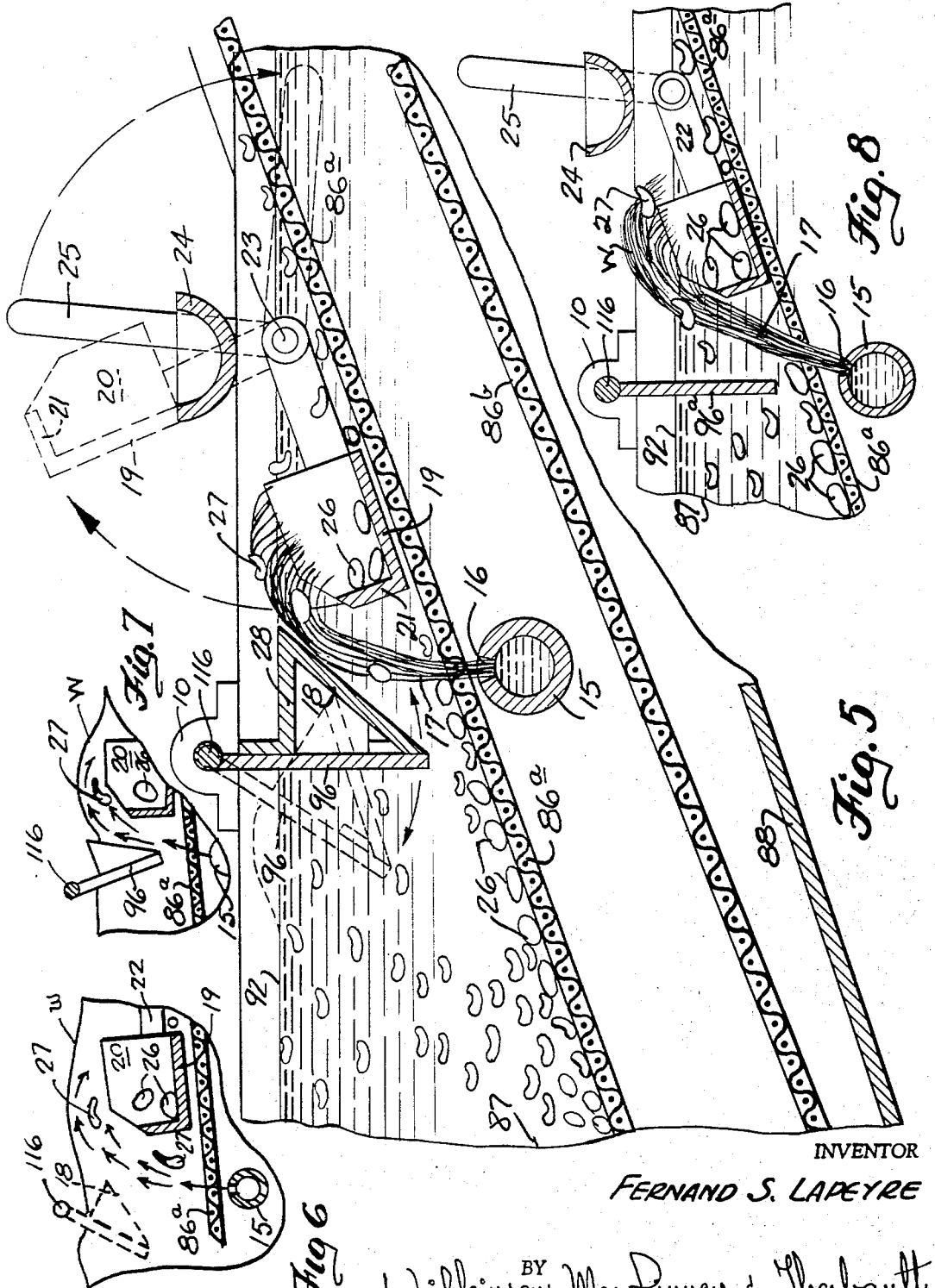

United States Patent Office 3,421,620
Patented Jan. 14, 1969

1

3,421,620
PROCESS AND DEVICE FOR SEPARATION OF COMPONENTS OF DIFFERENT SPECIFIC GRAVITIES FROM MIXTURES THEREOF
Fernand S. Lapeyre, New Orleans, La., assignor to The Laitram Corporation, New Orleans, La., a corporation of Louisiana
Filed May 24, 1965, Ser. No. 458,130
U.S. Cl. 209—157                    18 Claims
Int. Cl. B03d 1/24

ABSTRACT OF THE DISCLOSURE

A process and device for the separation of components which are heavier than water but of different specific gravities in which the components to be separated are placed in a liquid bath and the two components are first lifted and then moved over a trap whereby the heavier of the two components by gravitation will settle out in the trap and the lighter component will pass over the trap and be separated.

---

The invention will find substantial utility in separating shrimp from trash either on shipboard in an initial trash separation before the shrimp are sent to the peeling machines or afterwards just preparatory to the delivery of the shrimp to the peeling machine.

The invention applies equally well to raw shrimp, or to frozen headless shrimp.

In theory, the invention utilizes a current of liquid in a fountain effect to separate components of different specific gravity. In the case of shrimp, the invention depends on the comparative light weight of the shrimp coupled with the current as against the heavier weight of the trash or foreign matter which involves to a large extent shells (oyster, clam, snail, etc.) which are destructive of the surfaces of the peeling rollers.

A single separator according to the invention may serve a battery of peeling machines.

For convenience in illustration and description, but without limitation, the invention may, in one form, be embodied in a feed mechanism for a peeling machine as disclosed in prior Patent 2,574,044, granted Nov. 6, 1951.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 5 is a fragmentary longitudinal section taken through the feed tank on an enlarged scale illustrating the steps of the process.

FIGURE 6 is a schematic view showing one step of the process.

FIGURE 7 is a similar view showing the sequential step.

FIGURE 8 is a fragmentary sectional view through the tank illustrating a modification.

Referring more particularly to the drawings and utilizing the same reference numerals from the Patent 2,574,-

2

Figure 1:
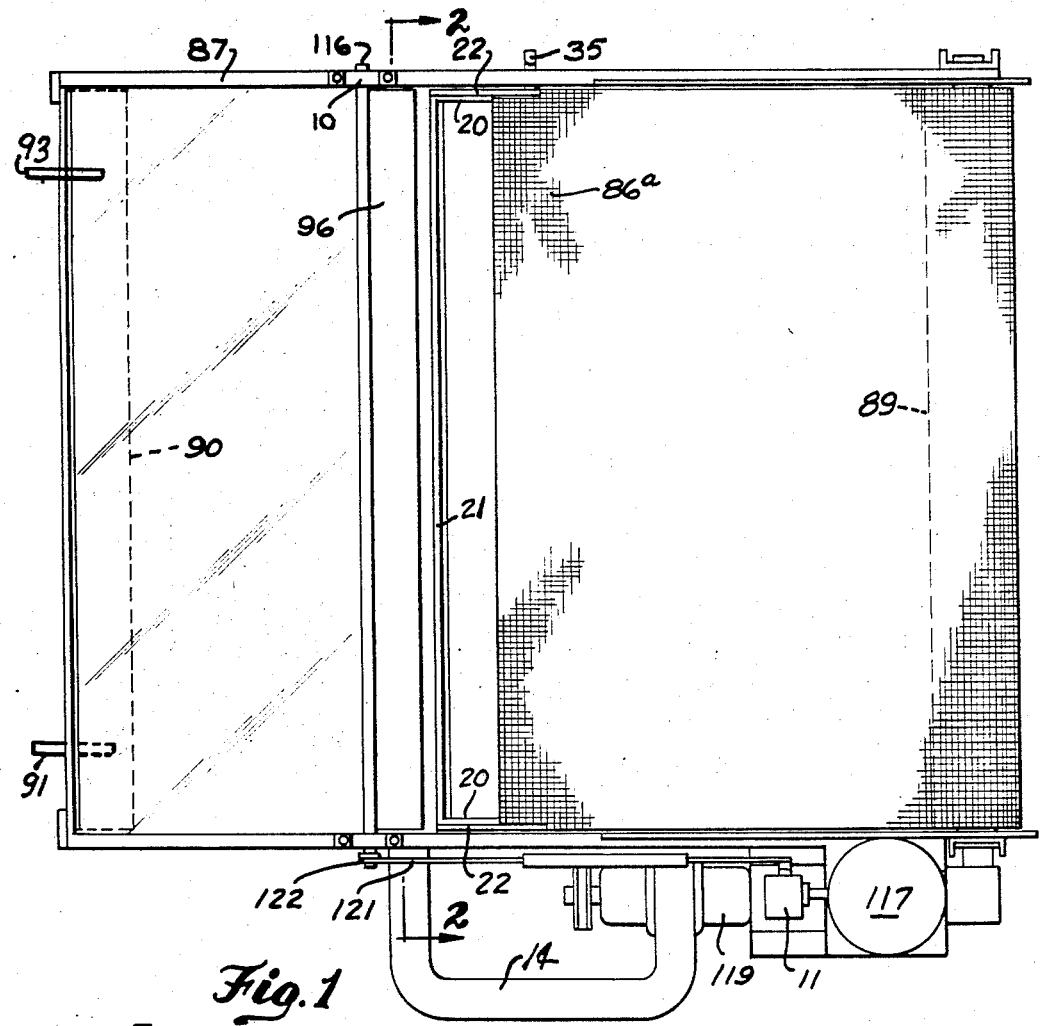
FIGURE 1 is a top plan view of a feed mechanism for a shrimp peeling machine as modified to include the features of the present invention.

044 which identify similar parts, 86ª designates the upper run and 86ᵇ the lower run of an endless conveyor of wire mesh or other foraminous material, such conveyor being disposed on an inclination in a tank 87 having an inclined bottom 88. The conveyor runs over a high roller 89 and a low roller 90, as shown more particularly in FIGURE 3. The high roller, as in the patent, may be disposed adjacent the high end of the inclined peeling rollers, or a conveyor serving a battery of peeling machines.

The tank 87 is provided with fresh water through an inlet pipe 91, the water being maintained at a level 92 by means of an overflow outlet pipe 93. A lower hinged baffle 95 is mounted on the tank wall adjacent the lower conveyor roller 90 for preventing the trash from entry into the space between the conveyor and adjacent end wall.

A paddle 96 is mounted approximately at the water line 92 with parts extending above and parts extending below the water line at an intermediate part of the upper run 86ª of the conveyor, the same being carried by the side tank walls through trunnions 116 of the paddle mounted for oscillating movement in bearings 10.

Figure 4:
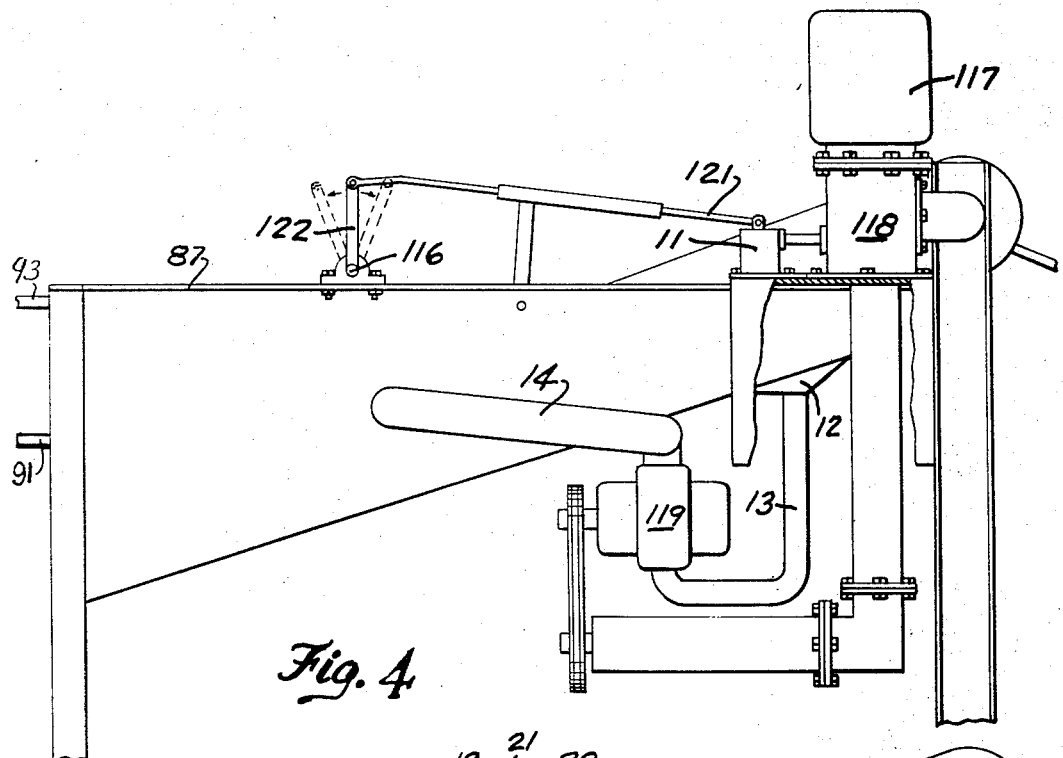
FIGURE 4 is a side elevational view of the feed mechanism including the tank and illustrating a form of propulsion for the paddle and water supply under pressure to the header which produces the fluid current.

Although the paddle 96 may be oscillated by any particular mechanism, FIGURE 4 illustrates an arm 122 fast on one trunnion 116, extending upwardly and pivotally connected to an oscillator pitman 121 deriving its motion from a motor 117 through a reducer 118 and a crank mechanism 11.

The motor 117 may also be utilized to drive a pump 119 which draws water from the tank and re-circulates such water to the tank in a manner prescribed by the invention. For this purpose the inclined bottom 88 of the tank is provided with a sump 12 near an upper portion thereof but below water line, which sump supplies water to the intake pipe 13 for the pump 119.

Figure 2:
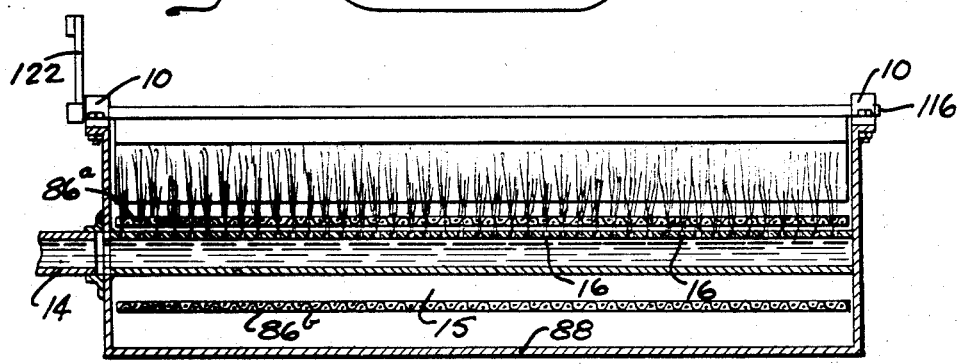
FIGURE 2 is a cross-sectional view taken on the line 2—2 in FIGURE 1.

The discharge side of the pump 119 is connected to a discharge pipe 14 which supplies water under high-pressure to a header 15 extending completely across the tank below the upper run 86ª of the conveyor and at a locality forward of the vertical plane passing through the trunnions 116 of the paddle 96. In this header 15 are numerous orifices 16 at upper portions thereof through which issue upwardly submerged fluid or liquid jets constituting a strong upthrust fluid current 17 which may be in sheet form as illustrated in FIGURE 2.

Figure 3:
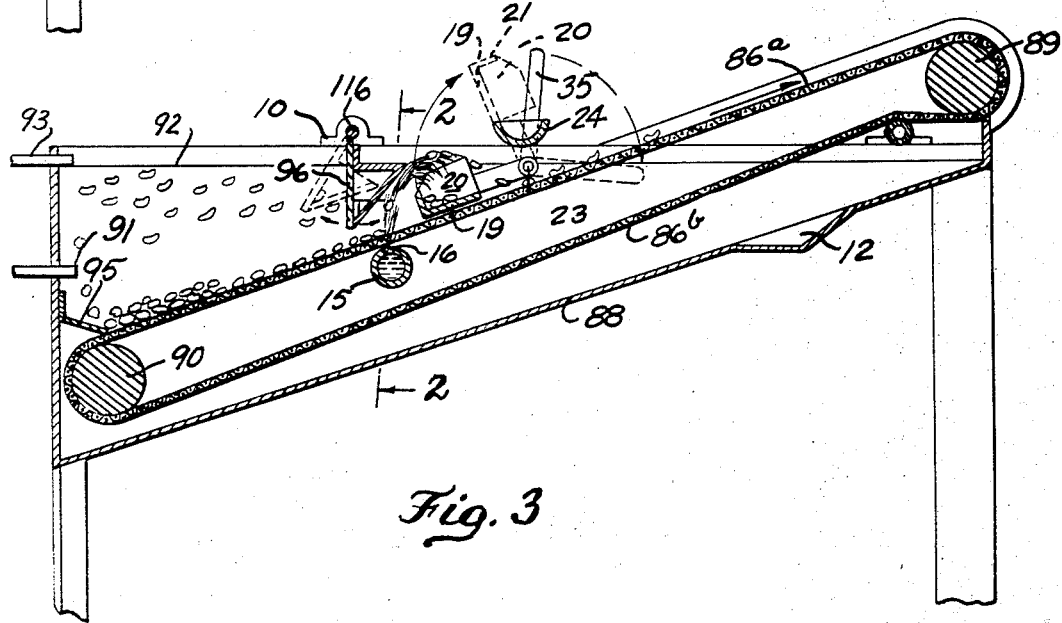
FIGURE 3 is a longitudinal sectional view taken through the feed tank and included mechanism showing the additional parts attributable to the present invention.

In one form of the invention, as illustrated more particularly in FIGURES 3 and 5, the paddle 96 will carry forwardly or downstream thereof an inclined deflector 18 which, in an intermediate position in which the paddle 96 is substantially vertical, will assume an oblique position substantially in line with the upthrust current 17 for diverting such current forwardly or in a downstream direction. This deflector 18 shall preferably have sufficient extension to project below and above the water line.

Forwardly or downstream of the paddle and the upthrust current 17 is a trap for the trash, such trap being preferably in the form of a receptacle comprising a bottom wall 19, end walls 20 and a rear wall 21 at the upstream side of the tank, which wall 21 may be of short height compared to the end walls 20 and may be cut as to its upper edge on the inclination as illustrated.

The trap is supported in any suitable manner in the position indicated in FIGURE 5 in which the bottom wall 19 is spaced closely above the upper run 86ª of the conveyor sufficient to reject any trash attempting to enter beneath the bottom wall 19 and said upper conveyor run 86ª.

The trap is preferably movably supported, as by the two arms 22, one at each side of the trap extending forwardly or downstream of the trap and being pivoted to the pivot members 23 at the sides of the tank for lifting movement, as indicated in dotted lines in FIGURE 5, by which the trash content accumulated in the trap can be dumped, for instance, into a trough 24 supported across the tank between the side walls thereof and either permanently in this position or from time to time hauled to this position when dumping or unloading of the separated trash is required or desired.

The steps of the process are as follows:

While the trash is of greater specific gravity than the raw shrimp, both components of the mixed catch are of negative buoyancy, at least in fresh water, and they both will descend upon the conveyor.

The fluid current 17 generated by the pumped-in fluid, preferably liquid, into the header 15 and issuing through the orifices 16 in jet or sheet form constitutes a strong upthrust current through the body of the tank liquid having a fountain effect. This current will be pressurized to an extent sufficient to lift the trash 26 from the conveyor 86a, elevating such trash and entrained lighter component, namely shrimp 27, to a high location horizontally even with the open upper end of the trap receptacle which is carried on an inclination and thus its open top portion is presented in an easily accessible attitude to the components 26 and 27.

The strong upthrust current 17 is either aimed (FIGURE 8) to direct the components across the upper area above the trap receptacle or, where the upthrust current 17 is aimed in a more nearly vertical direction, by the action of the paddle 96 and/or the inclined deflector 18.

In either event the force of the upthrust current or pressurized stream 17 is effective to lift both components to a position above the trap receptacle, at which point the upward force of the current or stream is substantially spent, at least so far as the heavier component 26 is concerned so that such heavier particles are released to the force of gravitation and will drop down into the trap receptacle. However, the lighter component, namely the shrimp 27, has less tendency to sink and with upper portions of the current or stream will be carried over the receptacle and delivered to the conveyor 86a downstream of the receptacle. The conveyor will thereupon convey such lighter component or shrimp to any destination desired.

If the process is being utilized on shipboard the separated shrimp will be stowed in suitable bins while the heavier component, largely oyster and clam shells, may be dumped overboard. The separated shrimp will be afterwards delivered to processors for peeling and performing the peeling and packaging and such shrimp which have undergone a first separation on shipboard may be again put through a second separating process by use of a similar machine incorporated in the feed tank to a peeling machine or to a battery of such peeling machines.

By this process the mixed catch may be thus refined to the shrimp exclusively and all foreign matter excluded from the peeling operation which might be destructive of the peeling rollers.

The process thus serves to protect the machines from potential damage or short life and at the same time has a tendency to result in a commercial product of greater public acceptance.

Incident to the operation of the paddle 96a (FIGURE 8) or the paddle 96 plus the inclined deflector 18 (FIGURE 5), the paddle will have a double function of supplying the lighter shrimp component to the path of the upthrust stream or current, thus insuring the passage of the lighter component across the trap to the downstream delivery end of the conveyor.

The fountain action of the pressurized strong upthrust current or stream tends to flow up at the surface producing a wave form. The action of the paddle or deflector movable with the paddle will cause these wave forms to actually be propagated as waves moving forwardly over the trap receptacle which will have a further tendency to insure delivery of the heavier component to the receptacle and the delivery of the lighter component or shrimp to the rising upper portion of the conveyor forwardly of the trap receptacle.

This action is illustrated in FIGURES 6 and 7 in which $w$ in FIGURE 6 indicates a local rising liquid level due to this welling up of the fountain current and FIGURE 7 illustrates the wave W growing out of this local rise in liquid level and the coincident action of the paddle and/or paddle plus deflector pushing this upthrust liquid in a forward direction across the upper portion of the trap receptacle.

As shown in FIGURE 5, from time to time the action may be suspended and the trap receptacle lifted to the dotted line position where the accumulation of the shells and other heavier components will be dumped out of the forward open end of the receptacle into a trough or receiver 24 placed to receive same.

It will be apparent from FIGURE 5 that the bottom wall 19 of the trap receptacle in the operative position lies very close to the upper run 86a of the conveyor, so much so that the receptacle constitutes a barrier rejecting any heavier component 26 from entering the space between trap and conveyor.

According to the present invention the jets 17 of liquid issuing upwardly through the orifices 16 are directed through the meshes of the wire or other foraminous upper conveyor run 86a at high velocity thus dislodging the trash from the conveyor and at the same time creating substantial turbulence in the body of water at the area in which these jets are directed.

The jets 17 fan out transversely and longitudinally of the tank and they thus create a strong upthrust and surge, lifting the incident water of the tank therewith and ascending with such considerable force to the surface of the water as to rise thereabove in wave form composed of both jet and tank liquid. On encountering the deflector 18 such up-surge liquid will be diverted across the upper portion of the tank not only under the influence of the inclination of the deflector 18 but also under the impetus given this deflector by the oscillating movement it partakes with the oscillating paddle 96.

There results a succession of waves projected across the upper portion of the trap. The lighter raw shrimp will naturally tend to be carried by this wave and by the forward force thereof be projected completely across and downstream of the trap onto the upper run 86a of the conveyor at or about the point where it is emerging from the body of the tank water due to its travel inclination.

As the jets 17 issue from the orifices 16 under great force and velocity, high turbulence occurs in the tank water immediately in the path of such jets and adjacent tank water is also affected, acquiring a similar turbulence and surge, all of which tends to hold the heavier trash in suspension in the rising wave. Such jet action results in a strong upthrust current in the body of the tank water establishing an updraft which causes the adjoining tank water at both sides of the sheet to flow into the moving current whereby the tank water and the water of addition will well up and "boil" up to and above the surface in a rising dome or mound which eventually takes the form of a forwardly moving wave under the inducement of the oscillating paddle 96 and its deflector 18.

The upthrust vector and the paddle substantially horizontal vector are generally at right angles to one another culminating in a resultant which achieves wave form in a directional characteristic which carries the wave and its entrained shrimp and trash forwardly and over the trap in the manner and with the result above-described.

The deflector 18 is supported at its upper edge outboard of and by the paddle 96 by a top wall 28 forming with the paddle 96 and deflector 18 a triangulated hollow structure of which the deflector 18 is the hypotenuse. The internal space is well sealed off to prevent the entrance of liquid which would unduly load the paddle. In this arrangement the deflector 18 and top wall 28 contribute a progressively upwardly-enlarging structure from the lower end of the deflector 18, which structure, as seen in dotted lines in FIGURE 5, also functions to fill any troughs which the backward motion of the paddle may tend to form in front of the paddle, into which troughs the incipient waves w might have a tendency to collapse in a rearward direction.

The amplitude and period of the oscillations of the paddle and deflector may be calculated to give the desired wave pattern and degree of wave movement relative to the surface of the liquid. The angle of the deflector 18 may also be adjusted to give optimum results, taking into consideration the fact that the deflector changes its angle of presentation to the up-surge incident to its oscillating motion. An angle of 45° to the plane of the paddle 96 has been found to be satisfactory.

Although I have disclosed herein the best forms of the invention known to me at this time, I reserve the right to all such modifications and changes as may come within the scope of the following claims.

What is claimed is:

1. The process of separating heavier from lighter components mixed in a liquid body through which moves a foraminous conveyor at least partially immersed in the liquid comprising
   (a) injecting a pressurized stream of fluid through the foraminous conveyor from beneath the same in a generally upward direction sufficiently strong to lift the heavier component along with the lighter component with a portion of the body of liquid in a fountain-like effect,
   (b) trapping the heavier component as it settles out by gravitation as the upward force of the stream diminishes, while
   (c) moving over the lighter component onto the portion of the conveyor downstream from the locus of the pressurized fluid stream.

2. The process as claimed in claim 1 in which the pressurized stream is composed of
   (d) small jets in close succession across the liquid body and conveyor for producing the stream in substantially a sheet form.

3. The process of claim 1 in which the pressurized stream is
   (d) slanted from the vertical diagonally in the direction of movement of the conveyor.

4. The process of claim 1 further comprising
   (d) deflecting the pressurized stream forwardly in the direction of movement of the conveyor.

5. The process of claim 1 further comprising
   (d) imparting a forward propulsive movement to the pressurized stream in the direction of movement of the conveyor.

6. The process of claim 1 further comprising
   (d) imparting to the upper portion of the pressurized stream a propulsive movement in a forward direction with reference to the direction of conveyor movement, while
   (e) deflecting such upper portion of the pressurized stream in said forward direction.

7. The process of claim 1 further comprising
   (d) imparting to the pressurized stream a succession of forward components of motion at and above the normal surface of the liquid body above which the fountain wells up for propagating wave forms proceeding in the direction of movement of the conveyor so that the lighter component of the mixture may be eventually caught on the conveyor and separately moved by the conveyor to its ordained destination.

8. A device for separating heavier from lighter components mixed in a liquid body through which moves a foraminous conveyor at least partially immersed in the liquid comprising
   (a) means for injecting a pressurized stream of fluid through the foraminous conveyor from beneath the same in a generally upward direction sufficiently strong to lift the heavier component along with the lighter component with a portion of the body of liquid in a fountain-like effect,
   (b) means above the conveyor and forwardly of the pressurized stream for trapping the heavier component as it settles out by gravitation as the force of the stream diminishes, and
   (c) means for directing the said portion of the liquid body and pressurized stream forwardly in the direction of movement of the conveyor over the trapping means for moving the lighter component over the trapping means and subsequently onto the conveyor downstream of the trapping means.

9. The device of claim 8 in which the last-named means comprises
   (d) a header for the pressurized fluid stream, and
   (e) fluid jets in the header slanted diagonally forward.

10. The device of claim 8 in which the last-named means comprises
    (d) a baffle slanted forwardly and upwardly.

11. The device of claim 8 in which the last-named means comprises
    (d) a paddle movable forwardly and backwardly for propagating a succession of wave forms in cooperation with the welling up of the fountain stream above the surface of the liquid body and moving the waves over the trapping means.

12. The device of claim 8 in which the last-named means comprises
    (d) a vibrating paddle, and
    (e) an inclined baffle carried forwardly of the paddle in the path of upward movement of the pressurized stream.

13. The device of claim 8 in which the trapping means comprises
    (d) a receptacle positioned downstream of the pressurized stream in the direction of movement of the conveyor and relatively to the conveyor to act as a barrier for preventing entrance of the mixture components between the receptacle and conveyor.

14. The device of claim 8 in which the trapping means comprises
    (d) a receptacle, and
    (e) means for restraining the receptacle when in place and for permitting of the movement of the receptacle to a dump position.

15. The device of claim 8 in which the trapping means comprises
    (d) a receptacle having open top and forward portions, and
    (e) holding means about which the receptacle may swing upward about a forwardly displaced pivotal point to enable the receptacle to reach an elevated position with the open forward portions presented downwards for dumping the collected heavier component.

16. The device of claim 15 further comprising
    (f) a receiver positioned above the conveyor and liquid body in a location adapted to receive the dumped contents of the receptacle.

17. A specific gravity separator comprising
    (a) a tank containing a body of liquid and components of the mixture to be separated,
    (b) a foraminous conveyor in the tank inclined with a rear portion immersed below liquid level onto which said components gravitate and a forward portion rising out of the liquid,
    (c) a header crosswise of the tank and conveyor and below the conveyor at an immersed portion having jet orifices disposed generally upwards,
    (d) means for supplying pressurized liquid to the header at desired force for lifting both components from the conveyor and moving both components together upwardly in a strong fountain-like stream, (e) deflecting means positioned to intercept the pressurized stream and a portion of the liquid body at an upper portion of the same and to deflect same forwardly in the direction of movement of the conveyor, and (f) a trap receptacle located above the conveyor spaced forwardly of the deflecting means in a position to receive the heavier component separated out by gravitation while the lighter component is moved over to the conveyor downstream of the receptacle.

18. A device for separating heavier from lighter components mixed in a liquid body comprising (a) a foraminous conveyor adapted to move through the liquid body, (b) means above the conveyor for trapping the heavier component, and (c) pressurized stream of fluid means for projection through the foraminous conveyor from beneath the conveyor at a locus upstream of the trapping means in a generally upward direction and forwardly in the direction of movement of the conveyor over the trapping means for entraining and moving the lighter component over and clear of the trapping means and subsequently on to the conveyor downstream of the trapping means and entraining and moving the heavier component above the trapping means and permitting the heavier component to fall into said trapping means as the heavier component settles out by gravitation as the force of the stream means diminishes.

References Cited

UNITED STATES PATENTS

| | | | |
|---|---|---|---|
| 1,639,915 | 8/1927 | Wilmot | 209—157 X |
| 1,949,354 | 2/1934 | Burnside | 209—157 X |
| 2,422,657 | 6/1947 | Cleveland | 209—157 X |
| 2,574,044 | 11/1951 | Lapeyre et al. | 17—2 |
| 2,626,051 | 1/1953 | Innes et al. | 209—157 |
| 2,966,262 | 12/1960 | Hobart | 209—157 X |
| 3,097,161 | 7/1963 | Dudyak | 209—137 X |
| 3,110,665 | 11/1963 | Gustafson | 209—137 X |

HARRY B. THORNTON, *Primary Examiner.*

T. R. MILES, *Assistant Examiner.*

U.S. Cl. X.R.

17—2